US009931822B2

(12) United States Patent
Kawahara et al.

(10) Patent No.: US 9,931,822 B2
(45) Date of Patent: Apr. 3, 2018

(54) POLYESTER FILM, USE THEREOF AND METAL LAMINATED SHEET MADE OF SAID FILM, AND METAL CAN AND METAL LID MADE OF THE SHEET

(75) Inventors: Keizo Kawahara, Ohtsu (JP); Katsuya Ito, Ohtsu (JP); Kazutake Okamoto, Ohtsu (JP); Hideki Shimizu, Inuyama (JP); Hiroshi Nagano, Inuyama (JP); Mitsuo Inoue, Osaka (JP); Shoichi Gyobu, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/945,468

(22) Filed: Sep. 20, 2004

(65) Prior Publication Data

US 2005/0053796 A1 Mar. 10, 2005

Related U.S. Application Data

(63) Continuation of application No. 09/947,158, filed on Sep. 5, 2001, now abandoned.

(30) Foreign Application Priority Data

Sep. 5, 2000 (JP) .................................. 2000/269052
Sep. 5, 2000 (JP) .................................. 2000/269053

(51) Int. Cl.
B32B 27/36 (2006.01)
B32B 15/09 (2006.01)
C08J 5/18 (2006.01)
C08L 67/02 (2006.01)

(52) U.S. Cl.
CPC .............. *B32B 27/36* (2013.01); *B32B 15/09* (2013.01); *C08J 5/18* (2013.01); *C08L 67/02* (2013.01); *B32B 2307/536* (2013.01); *B32B 2367/00* (2013.01); *C08J 2367/02* (2013.01); *Y10T 428/31681* (2015.04); *Y10T 428/31786* (2015.04)

(58) Field of Classification Search
CPC ... B32B 27/36; B32B 15/09; B32B 2307/536; B32B 2367/00; C08J 5/18; C08J 2367/02; Y10T 428/31786; Y10T 428/31681
USPC ......... 428/458; 524/539, 605; 525/444, 446, 525/448
See application file for complete search history.

(56) References Cited

U.S. PATENT DOCUMENTS

| 3,953,394 | A | | 4/1976 | Fox et al. |
| 4,009,312 | A | | 2/1977 | Hayashi et al. |
| 4,010,145 | A | * | 3/1977 | Russin .................. C08G 63/82 502/168 |
| 4,073,827 | A | | 2/1978 | Okasaka et al. |
| 4,130,552 | A | * | 12/1978 | Muntz ............................ 528/285 |
| 4,217,321 | A | | 8/1980 | Campbell |
| 4,243,712 | A | | 1/1981 | Hoheisel et al. |
| 4,286,011 | A | | 8/1981 | Wong |
| 4,351,758 | A | | 9/1982 | Lu et al. |
| 4,362,775 | A | | 12/1982 | Yabe et al. |
| 4,370,438 | A | * | 1/1983 | DeGuia ......................... 524/412 |
| 4,390,683 | A | * | 6/1983 | Yatsu ..................... C08G 63/19 428/480 |
| 4,565,850 | A | | 1/1986 | Prevorsek et al. |
| 4,704,417 | A | | 11/1987 | Bonin et al. |
| 4,915,885 | A | | 4/1990 | Avramova et al. |
| 5,188,744 | A | * | 2/1993 | Silverman ............... F25C 1/243 221/91 |
| 5,350,829 | A | * | 9/1994 | Kawamoto .......... C08G 63/189 528/272 |
| 5,384,354 | A | * | 1/1995 | Hasegawa et al. ........... 524/539 |
| 5,496,880 | A | | 3/1996 | Heuseveldt et al. |
| 5,541,244 | A | | 7/1996 | van der Meer et al. |

(Continued)

FOREIGN PATENT DOCUMENTS

EP 0685509 A1 * 12/1993
EP 0 638 412 A1 2/1995

(Continued)

OTHER PUBLICATIONS

Yin, Chemical Abstracts Services, Columbus, Ohio, Database Accession No. 123:146493 CA (XP-002200752) (1995).
Liu et al., Chemical Abstracts Services, Columbus, Ohio, Database Accession No. 123:10403 CA (XP-002200753) (1995).
Kubo et al., Chemical Abstracts Services, Columbus, Ohio, Database Accession No. 127:347393 CA (XP-002202299) (1997).
Moore et al., Structure-Property Relationships in Polytetramethylene Terephthalate / Polytetramethylene Isophthalate Copolyesters Part I : Glass-Transition Temperatures, *Textile Research Journal*, 49(11): 623-631 (Nov. 1979).

(Continued)

*Primary Examiner* — Kevin R Kruer
(74) *Attorney, Agent, or Firm* — Leydig, Voit & Mayer, Ltd.

(57) ABSTRACT

A polyester film made from two kinds of polyester resins and having a specific DSC (and a specific glass transition point) is provided, (i) which is superior in mechanical property, capable of thermocompression bonding with a metal sheet, despite a high degree of crystallization of the film, reduces quality change of plastic film laminated on the metal sheet even if faced with variation of conditions of thermocompression bonding with the metal sheet, and which is capable of thermocompression bonding even at a relatively low temperature, (ii) which is superior in formability, (iii) which is superior in flavoring property and impact resistance, and which obliterates occurrence of whitening or delamination of the film, or microcracks on the film, even if the film in the metal laminated sheet obtained by thermocompression bonding of the film on the metal sheet or on the surface of a metal can obtained by subjecting the metal laminated sheet to various form processings is crystallized, and (iv) which satisfies productivity at an industrial scale.

5 Claims, No Drawings

(56) References Cited

U.S. PATENT DOCUMENTS

| | | | |
|---|---|---|---|
| 5,618,621 A * | 4/1997 | Hasegawa et al. | 428/343 |
| 5,646,208 A | 7/1997 | Cattron et al. | |
| 5,747,174 A * | 5/1998 | Kimura | B29C 55/023 |
| | | | 428/480 |
| 5,753,736 A * | 5/1998 | Bhat et al. | 524/287 |
| 5,885,689 A | 3/1999 | Hasegawa et al. | |
| 5,948,525 A | 9/1999 | Kimura et al. | |
| 5,964,113 A * | 10/1999 | Wake et al. | 72/46 |
| 6,048,626 A * | 4/2000 | Tsuzuki et al. | 428/480 |
| 6,054,224 A * | 4/2000 | Nagai | H01B 3/42 |
| | | | 156/51 |
| 6,071,599 A * | 6/2000 | Kosuge et al. | 428/213 |
| 6,086,989 A * | 7/2000 | Kubo | B32B 15/08 |
| | | | 156/308.2 |
| 6,099,924 A | 8/2000 | Nakamaki et al. | |
| 6,242,560 B1 | 6/2001 | Gyobu et al. | |
| 6,270,855 B1 | 8/2001 | Jung et al. | |
| 2003/0069387 A1 | 4/2003 | Majima et al. | |
| 2009/0221420 A1* | 9/2009 | Higashijima | C08G 63/85 |
| | | | 502/162 |
| 2011/0318519 A1* | 12/2011 | Colhoun | C08J 5/18 |
| | | | 428/36.92 |
| 2014/0205785 A1* | 7/2014 | Goshima | C08L 67/02 |
| | | | 428/36.92 |

FOREIGN PATENT DOCUMENTS

| | | |
|---|---|---|
| EP | 0 685 509 A1 | 12/1995 |
| EP | 1 097 809 A1 | 5/2001 |
| JP | 46-35500 B | 10/1971 |
| JP | 61-26658 B2 | 6/1986 |
| JP | 06-039981 A * | 7/1992 |
| JP | 05 331302 | 12/1993 |
| JP | 06-009784 A | 1/1994 |
| JP | 6-240118 A | 8/1994 |
| JP | 07 145252 | 6/1995 |
| JP | 7-330924 | 12/1995 |
| JP | 10-100315 A | 4/1998 |
| JP | 10-110046 | 4/1998 |
| JP | 10 110046 | 4/1998 |
| JP | 10-110046 A * | 4/1998 |
| JP | 10-195210 | 7/1998 |
| JP | 10 195210 | 7/1998 |
| JP | 10-279708 | 10/1998 |
| JP | 11-049938 A | 2/1999 |
| JP | 2000-313755 A | 11/2000 |
| JP | 2002-69277 A | 3/2002 |
| JP | 2003-246869 * | 9/2003 |

* cited by examiner

POLYESTER FILM, USE THEREOF AND METAL LAMINATED SHEET MADE OF SAID FILM, AND METAL CAN AND METAL LID MADE OF THE SHEET

CROSS REFERENCE TO RELATED APPLICATIONS

This patent application is a continuation of U.S. patent application Ser. No. 09/947,158, filed Sep. 5, 2001, which is now abandoned.

TECHNICAL FIELD OF THE INVENTION

The present invention relates to a film useful as a material for constituting a film-laminated metal sheet, and to a metal can and a can lid produced using this metal laminated sheet.

BACKGROUND OF THE INVENTION

Metal cans, one mode of packaging container for food and drink, are superior in mechanical strength and permit long term preservation of contents. In addition, they allow easy packing of contents at a high temperature and sealing of the contents, as well as a sterilization treatment by retorting and the like. Therefore, they offer high reliability as to the safety and hygienic conservation in a packaging container. In view of many advantages they offer, various contents are packed in cans and used in great numbers in recent years, because they can preserve contents in a heating state and make separating collection of cans after use relatively easy.

The inside and outside of metal cans for food and drink are generally coated with a paint containing a thermosetting resin as a main component, with the aim of preserving flavor of contents, preventing corrosion of metal cans, improving appearance and protecting printed surfaces of the outside of cans. Because such metal cans are produced using great amounts of solvents, environmental problems due to desolvation during production and hygienic problems due to the solvents remaining in the coated film are inevitable. In addition, the flavor may be degraded due to the oligomer remaining from a reaction failure during heat setting.

In an attempt to solve these problems, a method including laminating a plastic film on a metal has been proposed. A laminate of a plastic film on a metal sheet is proposed for the application to so-called a three-piece can (hereinafter to be abbreviated as 3P can) and a two-piece can (hereinafter to be abbreviated as 2P can). Spreading of 2P cans is desirable for the production of seamless cans.

2P cans are generally produced by punching out a metal laminate consisting of a metal sheet and a plastic film with a can forming machine and draw-wipe forming. In this can forming step, the film is required to follow spread of the metal sheet while standing the shear of draw-wipe forming.

To meet the request, a film superior in can forming performance, which is made from a polyethylene terephthalate (PET) polyester resin having a specific intrinsic viscosity and a polybutylene terephthalate (PBT) polyester resin having a specific intrinsic viscosity has been proposed. However, this dramatic film does not necessarily follow spreading of a metal sheet, nor does it show a sufficient adhesion to a metal sheet, when subjected to a wipe step (draw-wipe forming) after drawing. In addition, the film is subject to delamination or development of microcracks during forming, thus showing insufficient formability.

The amount of oligomer eluted from a laminated metal sheet and a metal can obtained using this film is considerably less as compared to that from a metal sheet or a metal can obtained by applying a paint containing a thermosetting resin as a main component. For a further decrease, a metal container can formed from a metal sheet laminated with a film may be heat treated to increase the degree of crystallization of the film, but rapid crystallization results in the production of spherulite, delamination of the film and the like, which require demanding an improvement. A merely high degree of crystallization makes thermocompression bonding of the metal sheet and the form-processing difficult.

A plastic film having suitable crystallinity (suitable degree of crystallization), which is made from two kinds of polyester has been proposed to solve the above-mentioned various problems. This film simultaneously satisfies followability to the spreading of a metal during can forming and retention of the flavor of the can contents, which is attributable to the fact that the film is made from two kinds of polyesters and the film has suitable crystallinity. The film first has suitable crystallinity, but a treatment of the film at a high temperature causes transesterification leading to copolymerization with different polyester, thus degrading the crystallinity. To keep the degree of crystallization of the film in a suitable range during processing into products, for example, the time for melting the polyester may be shortened and the heat applied to the film during drawing and a heat treatment step after melting may be reduced.

For the productivity at an industrial scale, these conventional methods are faced with a limitation. This is because the amount of a resin to be discharged needs to be increased for improving productivity, a higher capacity of an extruder is necessary for producing a plastic film free of radical variation in quality such as inconsistent thickness, and the residence time of the resin needs to be prolonged to stabilize the discharge, and the like. The above-mentioned conventional methods are insufficient to achieve the productivity to afford a plastic film having the necessary properties and a metal can and the like obtained therefrom.

Given the above situation, there is a demand on a plastic film for a metal laminate, which has the properties necessary for a metal can and a lid of a can, which maintains the property after form processing into a final product, and which is superior in productivity at an industrial scale.

The present invention aims at achieving the following objects.
(i) Provision of a film for a metal laminate, which is superior in mechanical property, capable of thermocompression bonding with a metal sheet, despite a high degree of crystallization of the film, reduces quality change of plastic film laminated on the metal sheet even if faced with variation of conditions of thermocompression bonding with the metal sheet, and which is capable of thermocompression bonding even at a relatively low temperature.
(ii) Provision of a film for a metal laminate, which is superior in formability (can forming performance and the like).
(iii) Provision of a film for a metal laminate, which is superior in flavor property and impact resistance, and which obliterates occurrence of whitening or delamination of the film, or microcracks on the film, even if a film on the surface of a metal laminated sheet obtained by thermocompression bonding of the film on the metal sheet or on the surface of a metal can obtained by subjecting the metal laminated sheet to various form processings is crystallized.
(iv) Provision of a film for a metal laminate, which satisfies productivity at an industrial scale.

SUMMARY OF THE INVENTION

According to the present invention, a polyester film made from a polyester resin composition containing a specific amount of a polyethylene terephthalate (hereinafter sometimes to be abbreviated as PET) resin (A) (hereinafter sometimes to be abbreviated as polyester resin (A)) and a specific amount of a polybutylene terephthalate (hereinafter sometimes to be abbreviated as PBT) resin (B) (hereinafter sometimes to be abbreviated as polyester resin (B)), which satisfies the following (I) or (II) is provided, which can solve the problems of the prior art technique.

(I) A laminated film, which is obtained by melting or softening the film to allow adhesion to an aluminum plate, has 2 or more melting peaks in an area corresponding to not less than 180° C. and less than 280° C. of differential scanning calorimetry (DSC) as measured after standing in a 270° C. atmosphere for 10 minutes.

(II) The film has 2 or more melting peaks in an area corresponding to not less than 180° C. and less than 280° C. of differential scanning calorimetry (DSC) as measured after standing in a 280° C. atmosphere for 10 minutes, and the film has a glass transition point (Tg) of not less than 20° C. and less than 60° C.

Accordingly, the present invention provides a polyester film made from a polyester resin composition comprising 10-70 wt % of polyester resin (A) and 90-30 wt % of polyester resin (B), which film satisfies either the above-mentioned (I) or (II). Preferably, the polyester film satisfies both the above-mentioned (I) and (II).

The preferable use of the polyester film of the present invention is a metal laminate, and the film can provide one wherein the polyester film is laminated on a metal sheet, and a metal can or a lid of a metal can utilizing the metal laminated sheet.

DETAILED DESCRIPTION OF THE INVENTION

The present invention is described in detail in the following.

polyester Resin (A)

The polyester resin (A) to be used in the present invention is obtained by melt polycondensation of a terephthalic acid component and an ethylene glycol component as main components (preferably 70-100%, more preferably 90-100%), with or without sequential solid-state polycondensation. The polyester resin (A) contains an ethylene terephthalate (ET) structure in a repeat unit and is superior in rigidity, heat resistance, transparency and the like, and therefore, is superior in can forming performance, gloss, corrosion resistance and the like.

The polyester resin (A) preferably has an intrinsic viscosity of 0.50-0.90, more preferably 0.55-0.80. It preferably has a weight-average molecular weight of 20,000-200,000, more preferably 50,000-100,000. The distribution of molecular weight as expressed by the ratio of the weight-average molecular weight to the number-average molecular weight is preferably 2.0-10.0, more preferably 2.0-4.0. These property values are obtained by the measurement methods to be mentioned later.

When one or both of the intrinsic viscosity and the weight-average molecular weight become smaller than the above-mentioned ranges, a film having a mechanical strength to allow practical application is difficult to obtain. When they exceed the above-mentioned ranges, the film may show degraded thermocompression bonding property to a metal sheet. When the distribution of molecular weight is smaller than the above-mentioned range, the film faces difficulty in following spreading of the metal sheet during can forming. When it exceeds the above-mentioned range, the film contains greater amounts of oligomer, thus degrading the flavor property.

The polyester resin (A) can be copolymerized with a different component as appropriate, as long as the effect of the present invention is not impaired. Examples of copolymerizable other acid component include aromatic dicarboxylic acid (e.g., isophthalic acid, phthalic acid (anhydride), 2,4-naphtalene dicarboxylic acid, 5-sodium sulfoisophthalate, etc), aliphatic dicarboxylic acid (e.g., oxalic acid, succinic acid, adipic acid, sebacic acid, azelaic acid, dodecanedicarboxylic acid, maleic acid (anhydride), fumaric acid, itaconic acid, citraconic acid, mesaconic acid, etc), alicyclic dicarboxylic acid (e.g., hexahydrophthalic anhydride, hexahydrophthalic acid, cyclohexanedimethanecarboxylic acid, etc), hydroxycarboxylic acid (e.g., dimer acid having 20 to 60 carbon atoms, p-hydroxybenzoic acid, lactic acid, β-hydroxybutyric acid, ε-caprolactone, etc), polyfunctional carboxylic acid (e.g., trimellitic acid (anhydride), trimesic acid, pyromellitic acid (anhydride), etc) and the like.

A different copolymerizable alcohol component includes, for example, aliphatic diol (e.g., diethylene glycol, triethylene glycol, 1,2-propanediol, 1,3-propanediol, 1,4-butanediol, 1,4-pentanediol, 1,6-hexanediol, neopentyl glycol, polyethylene glycol having a molecular weight of 200-3,000, polypropylene glycol having a molecular weight of 200-3,000, polytetramethylene glycol having a molecular weight of 200-3,000 and the like), alicyclic diol (e.g., 1,4-cyclohexane dimethanol, 1,4-cyclohexane diethanol, etc), aromatic diol (e.g., ethylene oxide or propylene oxide adduct with bisphenol A, bisphenol S and the like), polyfunctional alcohol (e.g., trimethylolpropane, glycerol, pentaerythritol, etc) and the like.

The production method of polyester resin (A) may be a known one. For example, dimethyl terephthalate and ethylene glycol (where necessary, slurry of different copolymerizable components) are successively supplied into an esterification reactor containing polybis (β-hydroxyethyl) terephthalate and a low polymer thereof, and the mixture is reacted at a temperature of about 250° C. for about 3-10 hours to successively give esters having an esterification reaction rate of about 95%. These are transferred to a polymerization vessel, and melt polycondensation is carried out in the presence of a catalyst, such as germanium dioxide, antimony(III)oxide, tetra-n-butyl titanate, tetraisopropyl titanate, zinc acetate and the like, under reduced pressure of not more than 1.5 hPa at a temperature of 250-290° C., until desired intrinsic viscosity, molecular weight and distribution of molecular weight are achieved. It is also possible to subject a polyester obtained by the above-mentioned method to solid-state polycondensation by a conventional method.

Polyester Resin (B)

The polyester resin (B) to be used in the present invention is obtained by melt polycondensation of a terephthalic acid component and a 1,4-butanediol component as main components (preferably 80-100%, more preferably 90-100%), with or without sequential solid-state polycondensation. The polyester resin (B) has a butylene terephthalate (BT) structure in a repeat unit, shows high crystallinity, has high crystallization speed and low Tg, and therefore, is superior in can forming performance and appearance.

PBT has the following properties: an intrinsic viscosity of preferably 0.60-2.2, more preferably 1.0-1.5, a weight-average molecular weight of preferably 50,000-200,000, more preferably 80,000-150,000, and a distribution of molecular weight, which is a ratio of weight-average molecular weight to number-average molecular weight, of preferably 1.5-5.0, more preferably 2.0-4.5.

When one or both of the intrinsic viscosity and the weight-average molecular weight become smaller than the above-mentioned ranges, a film having a mechanical strength to allow practical application is difficult to obtain. When one or both of them exceed the above-mentioned ranges, the film may show degraded thermocompression bonding property to a metal sheet. When the distribution of molecular weight is smaller than the above-mentioned range, the film faces difficulty in following spreading of the metal sheet during can forming. When it exceeds the above-mentioned range, the film contains greater amounts of oligomer, thus degrading the flavor property.

The polyester resin (B) can be copolymerized with a different component as appropriate, as long as the effect of the present invention is not impaired. Examples of copolymerizable other acid component include those compounds exemplified above in relation to polyester resin (A).

The production method of polyester resin (B) may be a known one. For example, 1,4-butanediol and dimethyl terephthalate (where necessary, slurry of different copolymerizable components) are charged in a transesterification reactor and the mixture is reacted at a temperature near 230° C. for 5 hours to give a product having a transesterification rate near 95%. This is transferred to a polymerization vessel, and melt polycondensation is carried out in the presence of a catalyst such as tetra-n-butyl titanate, tetraisopropyl titanate and the like under reduced pressure of not more than 1.3 hPa at a temperature of 220-280° C., until desired intrinsic viscosity, molecular weight and distribution of molecular weight are achieved. It is also possible to subject a polyester obtained by the above-mentioned method to solid-state polycondensation by a conventional method.

Polyester Film

The polyester film of the present invention is made from a polyester resin composition containing polyester resin (A) in a proportion of 10-70 wt % (preferably 20-60 wt %, more preferably 30-50 wt %) and
polyester resin (B) in a proportion of 90-30 wt % (preferably 80-40 wt %, more preferably 70-50 wt %).

The use of polyester resin (A) for the composition of the present invention is important to obtain a film superior in mechanical property, impact resistance and flavor property, and the use of polyester resin (B) is important to give a film superior in flavor property and capable of thermocompression bonding (even at a relatively low temperature) with a metal sheet even at a high degree of crystallization.

It is important that the mixing ratio of polyester resins (A) and (B) should be within the above-mentioned range for a film superior in formability and productivity at an industrial scale. When the amount to be added of the polyester resin (A) is less than the above-mentioned range (namely, the amount of polyester resin (B) exceeds the above-mentioned range), the heat resistance is degraded and the can forming performance becomes inferior. When the amount to be added of polyester resin (A) exceeds the above-mentioned range (namely, the amount of polyester resin (B) is lower than the above-mentioned range), the adhesion to the metal sheet is degraded.

In the present invention, the polyester film essentially has the properties as described by the following (I) and/or (II).

(I) A laminated film, which is obtained by melting or softening the film to allow adhesion to an aluminum plate, has 2 or more melting peaks in an area corresponding to not less than 180° C. and less than 280° C. of differential scanning calorimetry (DSC) as measured after standing in a 270° C. atmosphere for 10 minutes.

(II) (i) The film has 2 or more melting peaks in an area corresponding to not less than 180° C. and less than 280° C. of differential scanning calorimetry (DSC) as measured after standing in a 280° C. atmosphere for 10 minutes, and (ii) the film has a glass transition point (Tg) of not less than 20° C. and less than 60° C.

It is important that the film of the present invention should meet the properties of the above-mentioned (I) and/or (II) to make the quality of the film laminated on the metal sheet hardly responsive to the variation of conditions during thermocompression bonding to a metal sheet. It is also important to prevent occurrence of whitening or delamination of the film, or microcracks on the film, when the film on the surface of a metal can is subjected to a crystallization treatment.

As used herein, by the "melting peak" is meant an endothermic peak in the DSC curve due to the melting of the crystals when the temperature rises.

The "melted or softened" of the above-mentioned (I) is achieved by a treatment with an amount of heat necessary for the film to melt or soften, which is preferably 180-250° C., more preferably 200-240° C. The adhesion of the film to an aluminum plate is not particularly limited, but can be provided by a conventional method. For example, a roller or a metal sheet heated to the temperature within the above-mentioned range is used to laminate a polyester film on a metal sheet for a metal laminate via the roller and the laminate is rapidly cooled.

The treatments as described in the above-mentioned (I) and (II)-(i) impose a greater burden on the film than the load placed on a laminated film when a 2P can is produced from a metal laminated sheet.

The above-mentioned (I) and (II)-(i) mean that the polyester film to be measured of the present invention maintains each melting point of the polyester resins (A) and (B) contained in the film, after a treatment of melting or softening the film to allow adhesion to an aluminum plate, and standing in a 270° C. atmosphere for 10 minutes in (I), and a treatment of standing in a 280° C. atmosphere for 10 minutes in (II)-(i). To impart this property to a film, a side reaction such as transesterification between polyester resins (A) and (B) and the like should not take place in the film under the conditions employed for these treatments.

For example, transesterification in the film generates a copolymer of polyester resins (A) and (B). As a result, the area corresponding to not less than 180° C. and less than 280° C. of DSC does not contain 2 or more melting peaks, and the ET structure of the main component of polyester resin (A) becomes at random, impairing the characteristic rigidity thereof, and the BT structure of the main component of polyester resin (B) becomes at random, impairing the characteristic high crystallinity thereof.

In the present invention, a side reaction such as transesterification between polyester resins (A) and (B) and the like in the polyester film can be suppressed by various methods. Preferable examples thereof include, but not limited to, those shown in the following. As long as the side reaction can be suppressed and the effect of the present invention can be imparted to the polyester film, any method can be used. The following methods can be used in combination.

One of the means to suppress a side reaction such as transesterification and the like is addition of a specific phosphorus compound (hereinafter also to be abbreviated as P compound) to a film resin composition.

The P compound in the present invention contains at least one or more bonds of P and O in a molecule. When at least one P—O bond is present in a molecule, the P compound organometallic chemically binds as a ligand with the metal catalyst present in the polyester resins (A) and (B), which is used for the polyester resin production, and deactivates the metal catalyst. As a result, the transesterification between polyester resins (A) and (B) can be suppressed, whereby the properties inherently possessed by polyester resins (A) and (B) can be utilized in the film.

As the P compound to be used in the present invention, organic phosphorus ethers, such as organic phosphite, organic phosphorus ethers, such as organic phosphine oxide and the like and the like, organic phosphorus esters such as organic phosphate and the like, can be exemplified. Examples of these include, but not limited to, aromatic phosphite such as triphenyl phosphite and the like, aliphatic phosphite such as bis(acetodeca)pentaerythritol diphosphite and the like, phosphite having an aliphatic skeleton and an aromatic skeleton, such as bis(2,6-di-t-butyl-4-methylphenyl)pentaerythritol dibenzophosphite, bis(2,6-di-t-butyl-4-methylphenyl)pentaerythritol diphosphite, bis(2,4-dicumylphenyl)pentaerythritol diphosphite, 2-[[2,4,8,10-tetrakis(1,1-dimethylether)dibenzo[d,f][1,3,2]dioxaphosphepin-6-yl]oxy]-N,N-bis[2-[2,4,8,10-tetrakis(1,1-dimethylether-dibenzo[d,f][1,3,2]dioxaphosphepin-6-yl)oxy]ethyl]ethanolamine, diphenyl isodecylphosphite and the like, organic phosphate such as trimethyl phosphate, triethyl phosphate, tributyl phosphate, ethyl diethylphosphonoacetate, benzyl ethylphosphonate, tri-2-ethylhexyl phosphate, tris(2-chloroethyl)phosphate and the like, and the like.

The P compound to be used in the present invention is preferably added to a polyester film composition in an amount to make the ratio of the amount of phosphorus [P] (mol) in the P compound to the amount of metal [M] (mol) in a metal catalyst, [P]/[M], not less than 1 and not more than 500. When the ratio is smaller than 1, the cordination efficiency of the metal to the P compound tends to become lower, leading to an insufficient degree of deactivation of the catalyst, and when it is greater than 500, the P compound acts as a plasticizer and tends to degrade the physical properties of the film. It is more preferably not less than 1 and not more than 100, still more preferably not less than 3 and not more than 100.

When the above-mentioned method of the present invention for suppressing a side reaction, such as transesterification and the like, by the use of a P compound is applied to an industrial production of films, the following three aspects should be met.
(i) The addition of the P compound should suppress transesterification due to the catalyst.
(ii) The P compound should be premixed with PET in advance.
(iii) The size of the resin pellets should be controlled when mixing.

As the P compound, one having both a pentaerythritol type skeleton and a phosphonic acid skeleton is effective for suppressing a side reaction. In consideration of the stability in an extruder, moreover, the melting point is preferably not less than 200° C., preferably less than the melt temperature of the P compound, more preferably not less than 205° C. and not more than 280° C., and the molecular weight is preferably not less than 200, more preferably not less than 250.

Such P compound is more preferably premixed with PET to give a master batch. By using a master batch, the suppressing effect of transesterification is enhanced.

As a means of suppressing the side reaction, such as polyester exchange reaction and the like, polyester resins (A) and (B) may be added in pellets. In this method, the weight per pellet of these resins should be different. For example, one pellet of one of the resins preferably has not less than 1.2 times, more preferably not less than 1.5 times and not more than 2 times, the weight of one pellet of the other resin. It is preferable to increase the weight per pellet of the polyester resin (A) pellets. By this method, the timing of melting of the both polyester resins can be staggered, whereby the effect of suppression of transesterification can be exerted.

While the above-mentioned (II)-(ii) limits the Tg of the polyester film of the present invention, when the Tg is higher than this range, the film may break during the can forming, and when it is lower, the laminated sheet does not come off from the mold due to the heat generated during the can forming.

As the range of Tg in the present invention, the lower limit is preferably not less than 20° C., more preferably not less than 35° C., and the upper limit is preferably not more than 50° C., more preferably less than 50° C.

There are various methods to control Tg of a film to fall within a specific range, so that the above-mentioned (II)-(ii) can be satisfied. For example, the ratio of polyester resin (A) comprising ET as a main component and the amount to be added of polyester resin (B) comprising BT as a main component, in the polyester resin composition, is limited to a specific range. Such a specific range to satisfy the above-mentioned (II)-(ii) is polyester resin (A): polyester resin (B)=not more than 50 wt % and not less than 20 wt %:not less than 50 wt % and not more than 80 wt %, preferably not more than 50 wt % and not less than 30 wt %:not less than 50 wt % and not more than 70 wt %. When the proportion of the polyester resin (B) is smaller than range, Tg becomes not less than 60° C., which in turn degrades the can forming performance. When the proportion of the polyester resin (B) exceeds this range, Tg becomes less than 20° C., which in turn causes blocking of films and degrades the can forming performance.

The polyester film of the present invention can be produced by a known method. For example, polyester resins (A) and (B) and P compound to be used in the present invention are mixed to produce a film, they may be directly melt-mixed in an extruder during film forming, or they may be melt-mixed to give chips, which may be processed to give a film.

The polyester film is generally obtained by forming upon addition of a lubricant. Examples of the lubricant include silicon dioxide, kaoline, clay, calcium carbonate, calcium terephthalate, aluminum oxide, titanium oxide, calcium phosphate, silicone particles and the like, with preference given to inorganic lubricants. Other additives besides the lubricant, such as stabilizer, colorant, antioxidant, antifoaming agent, antistatic agent and the like, can be added where necessary during melt-mixing.

According to the present invention, an extruder typically used for film forming can be used. Preferred are single screw extruder and twin screw extruder in the same direction or different directions, wherein the size and shape of the screw may be optional. Of these, from the aspects of productivity and stability of quality, one having a melt time (time from the initiation of melting of either polyester resin (A) or (B) until extrusion from T-die and adhesion to a chill roll of a melt) of not less than 21 minutes, more preferably not less than 29 minutes, is preferable. When the melt time is less than 21 minutes, the stability of quality becomes degraded during large scale production, with the propensity toward a quality failure. In view of the degradation of polyester resins (A) and (B), the melt time is preferably not more than 35 minutes, more preferably not more than 30 minutes.

The polyester film of the present invention can be obtained by, for example, thoroughly drying polyester resins (A) and (B) (where necessary, together with the compounds other than these), melt extruding them from an extruder at a temperature 10-80 degrees higher than the melting point of the both resins, using a T-shaped or circular spinneret and the like in a sheet or cylinder from the spinneret as an unoriented film. Then this unoriented film is at least uniaxially drawn. When it is uniaxially drawn, a tenter is desirably used to draw the film in a transverse direction. For example, the film is drawn uniaxially at preferably 90° C.-120° C. (more preferably 100° C.-110° C.) preferably 3.0-4.0 times (more preferably 3.5-4.0 times). For biaxial orientation, sequential biaxial orientation, wherein the film is drawn in the longitudinal direction using a stretching roll and the like, and then in the transverse direction, or simultaneous biaxial orientation, wherein the film is drawn in both orientations substantially simultaneously, is employed. For example, after drawing in the longitudinal direction at preferably 70° C.-110° C. (more preferably 80-100° C.) preferably 2.5-4.5 times (more preferably 3.0-4.0 times), the film is drawn in the transverse direction at preferably 90° C.-120° C. (more preferably 100° C.-110° C.) preferably 3.0-4.0 times (more preferably 3.5-3.8 times).

The oriented film can be subjected to a heat treatment, a surface treatment and the like, as long as the object of the present invention is not impaired. The polyester film may have a mono-layer or multi-layer.

The polyester film of the present invention has a thickness after drawing (when a treatment is applied after drawing, after the treatment) of preferably 5-50 μm, more preferably 15-30 μm.

The obtained polyester film is preferably used for a metal laminate. By laminating the polyester film on a metal sheet, a metal laminated sheet can be obtained. As a production method of a metal laminated sheet, there is mentioned, for example, a method comprising heating a roller or metal sheet to 150-270° C. in advance, laminating the film on a metal sheet via the roller, and rapidly cooling, thus allowing at least a layer of the film surface in contact with the metal sheet to be melt laminated on the metal sheet. The laminating speed is preferably 1-200 m/min, and in the case of an industrial scale, it is more preferably 130-200 m/min. It is also possible to apply heat-melting after temporal adhesion of the polyester film to a metal sheet.

While the metal laminated sheet of the present invention can be applied to various uses, it is preferably used for a metal can and a lid of a metal can. The metal laminated sheet of the present invention is also useful as a starting material of 3P cans and 2P cans (particularly 2P cans).

The hardness of a micro area of the film surface upon lamination with a metal sheet in the present invention can be expressed by a dynamic hardness. The dynamic hardness is as described in SHIMADZU HYORON-Vol. 50, No. 3 (1993. 12) p. 321 and shows hardness of a micro area. The dynamic hardness (DH) is based on a test load (P) and indentation depth (D) obtained by placing an indentor on a sample, forcing the indentor against the sample by increasing a pressing force at a certain rate from 0 to a given load, and expresses the property value combining the plastic deformation and elastic deformation of the sample. The relationship between DH and D and P is shown by the following formula 1.

$$DH = \alpha P/D*D \qquad \text{formula 1}$$

DH: dynamic hardness (gf/μm$^2$)
α: constant depending on shape of indentor
P: test load (gf),
D: indentation depth (μm)

The dynamic hardness in the present invention is a hardness of the surface of a film laminated on a metal sheet, from the outermost surface to a certain depth (1-5 μm) of the film. The film of the present invention preferably has a dynamic hardness of 0.5-50 gf/μm$^2$, more preferably 0.5-30 gf/μm$^2$, most preferably 0.7-45 gf/μm$^2$, particularly preferably 0.5-25 gf/μm$^2$. From the aspect of can forming performance, it is preferably 0.5-30 gf/μm$^2$.

When the dynamic hardness is smaller than the above-mentioned range, the surface of a micro area becomes soft, posing difficulty in maintaining the mechanical strength of the area, and permitting easy occurrence of film breakage during can forming. When it is greater than the above-mentioned range, the surface of a micro area becomes too hard, the film cannot easily follow spreading of a metal sheet during draw-wipe forming and can forming steps.

The dynamic hardness of the film of the present invention can be designed to fall within the specific range by including polyester resin (A) and polyester resin (B) in a film, and suppressing transesterification between polyester resin (A) and polyester resin (B). The transesterification can be suppressed by a method described in the above.

To make the film of the present invention superior in can formability and flavor property, and be free of whitening of the film after forming, the crystallization speed and the degree of crystallization may be controlled. The crystallization speed and degree of crystallization can be controlled by preventing copolymerization of polyester resin (A) and polyester resin (B) by suppressing transesterification between polyester resin (A) and polyester resin (B) and the like. The transesterification can be suppressed by a method described in the above.

EXAMPLES

The present invention is explained in detail in the following by referring to Examples. The present invention is not limited by these examples. The "part" in the following description refers to "part by weight". Various property values of the polyester and polyester films in the Examples were measured by the following methods.
(a) Intrinsic Viscosity
 Measured at 20° C. using an equivalent mixture of phenol and tetrachloroethane as a solvent.
(b) Dynamic Hardness (DH Hardness)
 Measured with respect to the surfaces of a polyester film before lamination on aluminum sheet and polyester film after lamination and thermocompression bonding.
model: SHIMADZU DYNAMIC ULTRA MICRO HARDNESS TESTER DUH201
 load: 0.5 gf
 load rate: 0.0145 gf/sec
 measurement temperature: 25° C.
 humidity: 64%
 test mode: soft material measurement mode
(c) DSC
 A sample (10 mg) was melted at a given temperature for 10 minutes, rapidly cooled, and subjected to measurement under a nitrogen flow at a temperature rise rate of 20° C./min from −20° C. The given temperature was 280° C. for Examples 1-7, and 270° C. for Examples 8-14. In Examples 8-14, a film peeled off from the metal sheet was used as a sample.

MAC SCIENCE Corporation DSC 3100S was used for the measurement.

The presence of a peak (TmA: 235-253° C.) derived from polyester resin (A) and a peak (TmB: 205-235° C.) derived from polyester resin (B) in the area corresponding to not less than 180° C. and less than 280° C. was confirmed. When 2 or more peaks (TmA and TmB and the like) are present in the above-mentioned area, transesterification was considered to have not occurred. The observed TmA and TmB are also shown along with the judgment results. When 2 or more melting peaks are not present in the above-mentioned area, occurrence of transesterification was acknowledged. In Comparative Examples, only one peak was observed, and the value then is also shown in Table.

(d) Molecular weight (weight-average molecular weight [Mw] and number-average molecular weight [Mn]) and distribution of molecular weight ([Mw]/[Mn])

Preparation of Sample

Each polyester resin (15 mg) was dissolved in 1 ml of hexafluoroisopropanol/chloroform=2/3 (v/v) and melted in 20 ml of chloroform.

As a standard substance, a polystyrene (TOSOH) solution was prepared and used as a sample for GPC calibration curve.

Analysis Conditions
  Column: gmhxl-gmhxl-g2000hxl (TOSOH)
  Mobile phase: HFIP/Chloroform=2/98 (v/v)
  Flow rate: 0.7 ml/min
  Column temp: 40° C.
  Detection vol: 200 ml Apparatus Used for Measurement
  GPC: SYDTEM-21 (Shodex)
  Data treatment: SIC-480 (SIC, System Instruments Co., Ltd.)

(e) Glass Transition Point

Measured according to a method similar to the above-mentioned (c).

(f) Can Forming Performance

A film sample was laminated on an aluminum plate (thickness: 300 µm, heated at 200° C.) for temporary adhesion and re-melted at 240° C. After re-melting, the laminate was subjected to draw-deep forming and draw-wipe forming to give 2P cans. The damage such as delamination, breakage, crack and the like of the film after forming into a 2P can was visually observed and then observed under a fluorescence microscope (magnification ×80), based on which the film was evaluated according to the following criteria.

○: Of 100 cans, no damage in not less than 95 cans.
Δ: Of 100 cans, no damage in 80-94 cans.
x: Of 100 cans, some damage in not less than 21 cans.

Production Example

Polyester Resins (A1)-(A3)

In a stainless steel reactor equipped with a stirrer, a thermometer and a partial refluxing condenser were charged dimethyl terephthalate (1940 parts), ethylene glycol (1364 parts), zinc acetate (1.02 parts) and germanium dioxide (0.14 part), and transesterification was conducted at 160-220° C. over 4 hours. While elevating the temperature to 275° C. over 1 hour, the reaction system was gradually depressurized. The reaction was carried out until desired property values were obtained under reduced pressure of 0.2 mmHg (ca. 0.27 hPa) to give the objective polyester resin.

Where necessary, the resin obtained by the reaction under reduced pressure of 0.2 mmHg was charged in a blender and solid-state polycondensation was conducted while heating to 205° C. under reduced pressure to give the objective polyester resin having the desired property values.

Polyester Resins (B1)-(B4)

In a stainless steel autoclave equipped with a stirrer, a thermometer and a partial refluxing condenser were charged dimethyl terephthalate (1940 parts), 1,4-butanediol (1350 parts) and tetra-n-butyl titanate in the amounts shown in Table 1, and transesterification was conducted at 160-220° C. over 4 hours. While elevating the temperature to 275° C. over 1 hour, the reaction system was gradually depressurized. The reaction was carried out until desired property values were obtained under reduced pressure of 0.2 mmHg (ca. 0.27 hPa) to give the objective polyester resin.

Where necessary, the resin obtained by the reaction under reduced pressure of 0.2 mmHg was charged in a blender and solid-state polycondensation was conducted while heating to 180° C. under reduced pressure to give the objective polyester resin having the desired property values.

The property values of the obtained polyester resins (A1)-(A3) and (B1)-(B4) are shown in Table 1.

TABLE 1

| | symbol | polymerization method | intrinsic viscosity | Mw (×10$^3$) | Mn (×10$^3$) | Mw/Mn | Ti amount (×10$^{-5}$ wt %) * |
|---|---|---|---|---|---|---|---|
| Polyester resin (A) | A1 | melting alone | 0.62 | 58 | 17 | 3.3 | 0 |
| | A2 | melt and solid-state condensation | 0.63 | 60 | 23 | 2.7 | 0 |
| | A3 | melt and solid-state condensation | 0.75 | 60 | 20 | 3.0 | 0 |
| Polyester resin (B) | B1 | melt and solid-state condensation | 1.10 | 87 | 33 | 2.7 | 4 |
| | B2 | melt and solid-state condensation | 1.20 | 103 | 36 | 2.9 | 4 |
| | B3 | melt and solid-state condensation | 1.40 | 134 | 44 | 3.1 | 5 |
| | B4 | melting alone | 1.10 | 84 | 22 | 3.9 | 10 |

* the amount to be added of tetra-n-butyl titanate

Examples 1-7

Polyester resin (A), polyester resin (B) and organic phosphorus compound (C) were mixed in the ratio shown in Table 2 and melt-mixed in a biaxial extruder (diameter 45 mm, L/D 60) at 280° C., extruded and rapidly cooled to give a 190 µm thick unoriented film, which was drawn 4 times in the longitudinal direction at 90° C., then 4 times in the transverse direction at 235° C. After the drawing, the film was heat-treated at 175° C. and cooled to give a 25 µm thick film. The evaluation results of the obtained films are shown in Table 2.

The films free of transesterification showed fine can forming performance.

Comparative Examples 1-7

In the same manner as in Examples 1-7 except that organic phosphorus compound (C) was removed, the films of Comparative Examples 1-7 were obtained. The property results of the obtained film are shown in Table 2.

TABLE 2

| | Composition ratio | [P]/[M] | TmA (C°) | TmB (C°) | Tg (c°) | Occurrence or otherwise of transesterification | DH hardness (gf/μm²) | can forming performance |
|---|---|---|---|---|---|---|---|---|
| Ex. 1 | A1/B2/P36 = 40/60/0.10 | 4.1 | 239 | 217 | 48 | none | 7.5 | ○ |
| Ex. 2 | A1/B1/P36 = 40/60/0.15 | 4.6 | 244 | 222 | 47 | none | 8.5 | ○ |
| Ex. 3 | A3/B3/BPP = 40/60/0.17 | 4.8 | 245 | 225 | 50 | none | 9.5 | ○ |
| Ex. 4 | A2/B4/P36 = 40/60/0.50 | 8.2 | 238 | 216 | 51 | none | 8.6 | ○ |
| Ex. 5 | A2/B4/P45 = 45/55/1.50 | 19.8 | 245 | 235 | 53 | none | 9.8 | ○ |
| Ex. 6 | A2/B1/BPP = 40/60/2.00 | 70.4 | 247 | 230 | 52 | none | 9.8 | ○ |
| Ex. 7 | A2/B1/P36 = 40/60/2.00 | 81.5 | 250 | 233 | 55 | none | 10.3 | ○ |
| Comparative Example 1 | A1/B2/P36 = 40/60/0.00 | 0 | 209* | | 44 | occurred | 0.4 | x |
| Comparative Example 2 | A1/B1/P36 = 40/60/0.00 | 0 | 219* | | 42 | occurred | 0.4 | x |
| Comparative Example 3 | A3/B3/P36 = 40/60/0.00 | 0 | 208* | | 40 | occurred | 0.4 | x |
| Comparative Example 4 | A2/B4/P36 = 40/60/0.00 | 0 | 208* | | 40 | occurred | 0.3 | x |
| Comparative Example 5 | A2/B4/P36 = 45/55/0.00 | 0 | 206* | | 41 | occurred | 0.4 | x |
| Comparative Example 6 | A2/B1/P36 = 40/60/0.00 | 0 | 206* | | 42 | occurred | 0.3 | x |
| Comparative Example 7 | A2/B1/P36 = 40/60/0.00 | 0 | 207* | | 43 | occurred | 0.4 | x |

P36: bis(2,6-di-t-butyl-4-methylphenyl)pentaerythritol diphosphite,
P45: bis(2,4-dicumylphenyl)pentaerythritol diphosphite
BPP: bis(acetodeca)pentaerythritol diphosphite
*temperature of endothermic peak present in the not less than 180° C. and less than 280° C. area Examples 8-14 and Comparative Examples 8-14

Aluminum plates (thickness 300 μm) were heated to 200° C. and the films of Examples 1-7 and Comparative Examples 1-7 were laminated on one surface of the plates with a roller to give laminates (laminating speed 3 m/min). The DSC and DUH hardnesses of the obtained films were measured, the results of which are shown in Table 3.

The films free of transesterification showed fine can forming performance.

TABLE 3

| | TmA (° C.) | TmB (° C.) | Occurrence or otherwise of transesterification | DH hardness on metal sheet (gf/μm²) |
|---|---|---|---|---|
| Ex. 8 | 240 | 216 | none | 12.8 |
| Ex. 9 | 245 | 221 | none | 10.8 |
| Ex. 10 | 246 | 224 | none | 12.7 |
| Ex. 11 | 239 | 215 | none | 11.8 |
| Ex. 12 | 246 | 234 | none | 14.6 |
| Ex. 13 | 248 | 229 | none | 13.8 |
| Ex. 14 | 251 | 232 | none | 15.8 |
| Comparative Example 8 | 208* | | occurred | 1.5 |
| Comparative Example 9 | 218* | | occurred | 1.4 |
| Comparative Example 10 | 207* | | occurred | 1.4 |
| Comparative Example 11 | 207* | | occurred | 1.3 |
| Comparative Example 12 | 205* | | occurred | 1.5 |
| Comparative Example 13 | 205* | | occurred | 1.5 |
| Comparative Example 14 | 206* | | occurred | 1.4 |

*temperature of endothermic peak present in the not less than 180° C. and less than 280° C. area According to the present invention, a film for a metal laminate is provided, (i) which is superior in mechanical property, capable of thermocompression bonding with a metal sheet, despite a high degree of crystallization of the film, reduces quality change of plastic film laminated on the metal sheet even if faced with variation of conditions of thermocompression bonding with the metal sheet, and which is capable of thermocompression bonding even at a relatively low temperature, (ii) which is superior in formability, (iii) which is superior in flavor property and impact resistance, and which obliterates occurrence of whitening or delamination of the film, or microcracks on the film, even if the film in the metal laminated sheet obtained by thermocompression bonding of the film on the metal sheet or on the surface of a metal can obtained by subjecting the metal laminated sheet to various form processings is crystallized, and (iv) which satisfies productivity at an industrial scale.

This application is based on application Nos. 2000-269052 and 2000-269053 filed in Japan, the contents of which are incorporated hereinto by reference.

What is claimed is:

1. A metal can or a lid of a metal can, which comprises a metal laminated sheet comprising a metal sheet and a polyester film laminated on the metal sheet, wherein the polyester film comprises
   a polyester resin composition comprising 30-45 wt % of a polyethylene terephthalate resin (A),
   55-70 wt % of a polybutylene terephthalate resin (B), and
   a phosphorus compound of at least one kind selected from the group consisting of
   bis(2,6-di-t-butyl-4-methylphenyl)pentaerythritol dibenzophosphite,
   bis(2,6-di-t-butyl-4-methylphenyl)pentaerythritol diphosphite,
   bis(2,4-dicumylphenyl)pentaerythritol diphosphite,
   2-[[2,4,8,10-tetrakis(1,1-dimethylether)dibenzo[d,f][1,3,2]dioxaphosphepin-6-yl]oxy]-N,N-bis[2-[2,4,8,10-tetrakis(1,1-dimethyletherdibenzo[d,f][1,3,2]dioxaphos-phepin-6-yl)oxy]ethyl]ethanolamine,
diphenyl isodecylphosphite,
trimethyl phosphate,
ethyl diethylphosphonoacetate,
benzyl ethylphosphonate,
tri-2-ethylhexyl phosphate,
tris(2-chloroethyl)phosphate, and
bis(asetodeca)pentaerythritol diphosphate, and
wherein
the metal catalyst for polycondensation of the polybutylene terephthalate resin (B) comprises at least one selected from tetra-n-butyl titanate and tetraisopropyl titanate,
the film has a ratio [P]/[M] of the amount of phosphorus [P] (mol) in the phosphorus compound to the amount of metal [M] (mol) in a metal catalyst for polycondensation of the polyethylene terephthalate resin (A) and the polybutylene terephthalate resin (B) that is not less than 1 and not more than 81.5, and
the film after melting or softening to allow adhesion to an aluminum plate, followed by standing in a 270° C. atmosphere for 10 minutes, has 2 or more melting peaks in an area corresponding to not less than 180° C. and less than 280° C. of differential scanning calorimetry (DSC).

2. The metal can or a lid of a metal can of claim 1, wherein the polyester film has a dynamic hardness of 7.5-30 gf/μm².

3. The metal can or a lid of a metal can of claim 1, wherein PET (A) has an intrinsic viscosity of 0.62-0.75, and PBT (B) has an intrinsic viscosity of 1.1-1.4.

4. The metal can or a lid of a metal can of claim 1, wherein the 2 or more melting peaks in an area corresponding to not less than 180° C. and less than 280° C. of DSC are a peak (TmA: 235-253° C.) derived from the polyethylene terephthalate resin (A) and a peak (TmB: 205-235° C.) derived from the polybutylene terephthalate resin (B).

5. The metal can or a lid of a metal can of claim 1, wherein the glass transition point of the polyester film is not less than 20° C. and less than 60° C.

* * * * *